June 11, 1963  V. J. RIGOLINI  3,093,045
FILM MEASURING AND DOUBLE-EXPOSURE PREVENTION DEVICE
Filed Dec. 19, 1961  4 Sheets-Sheet 1

June 11, 1963 V. J. RIGOLINI 3,093,045
FILM MEASURING AND DOUBLE-EXPOSURE PREVENTION DEVICE
Filed Dec. 19, 1961 4 Sheets-Sheet 2

June 11, 1963     V. J. RIGOLINI     3,093,045
FILM MEASURING AND DOUBLE-EXPOSURE PREVENTION DEVICE
Filed Dec. 19, 1961     4 Sheets-Sheet 3

June 11, 1963 V. J. RIGOLINI 3,093,045
FILM MEASURING AND DOUBLE-EXPOSURE PREVENTION DEVICE
Filed Dec. 19, 1961 4 Sheets-Sheet 4
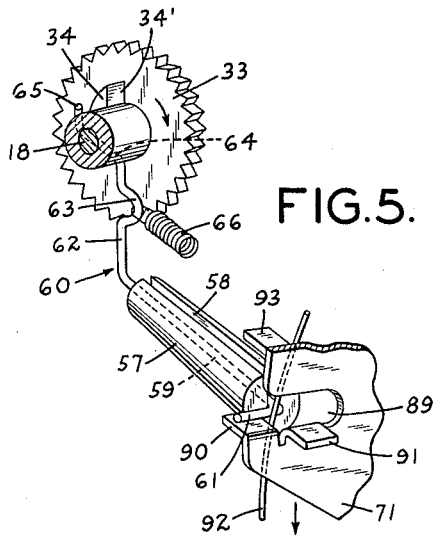
FIG.5.
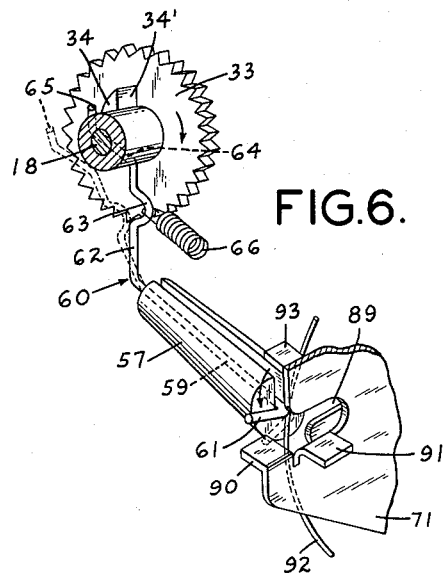
FIG.6.
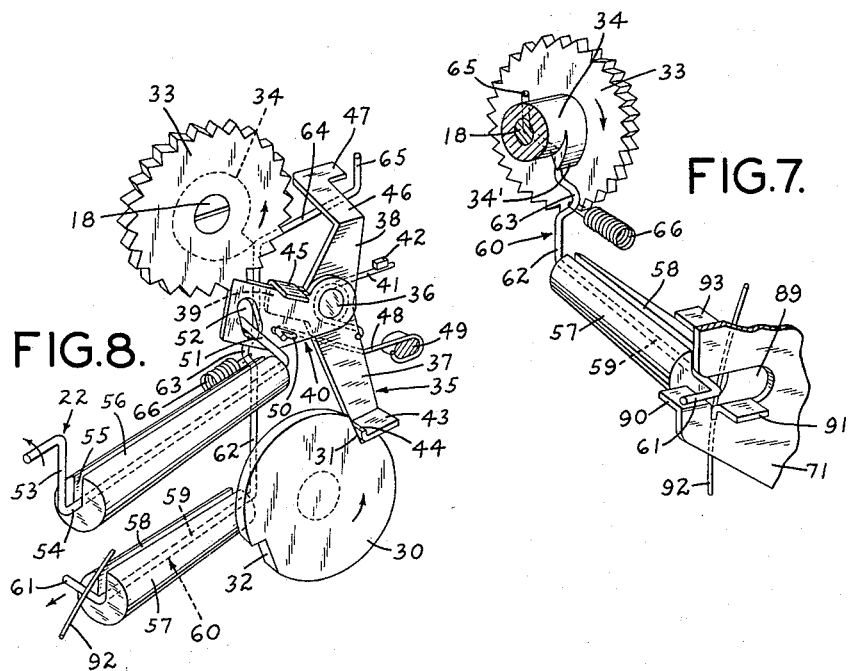
FIG.7.
FIG.8.

United States Patent Office 3,093,045
Patented June 11, 1963

3,093,045
FILM MEASURING AND DOUBLE-EXPOSURE
PREVENTION DEVICE
Vinnie J. Rigolini, Brooklyn, N.Y., assignor to Whitehouse Products, Inc., Brooklyn, N.Y., a corporation of New York
Filed Dec. 19, 1961, Ser. No. 160,496
10 Claims. (Cl. 95—31)

The present invention relates to roll film cameras, and more particularly to film metering and double exposure prevention devices for use in such cameras.

In roll film cameras it is desirable to have some means of automatically metering the amount of film advanced after each picture is taken. It is also desirable to have an interlock mechanism to prevent the shutter from being actuated more than once each time the film is advanced so that the camera operator will be prevented from inadvertently making double exposures. Devices to perform these functions have been known. For example, it is well known to provide a device which locks the film advancing mechanism, in response to the position of a film metering wheel, after a predetermined amount of film has been advanced; and such devices have also been combined with interlocks with the shutter actuating mechanism to prevent the shutter from being actuated more than once each time the film is advanced, thus to prevent inadvertent double exposures. The device of the present invention performs these functions in a simpler and more reliable manner than those devices in the prior art, and is particularly well adapted for use in relatively inexpensive cameras. Means are also provided to render the film metering and interlocking mechanism inoperative so that film may conveniently be inserted in the camera and removed from it.

Accordingly, it is an object of this invention to provide an improved film metering and double exposure prevention device for a roll film camera.

A further object of this invention is to provide, in conjunction with a film metering and double exposure preventing device, means to render the device inoperative when film is being inserted into or removed from the cameras.

Other and further objects, features and advantages of the invention will appear more fully from the following description of the invention.

In carrying out these objects in accordance with one embodiment of this invention, a film metering wheel is provided which engages and is rotated by the film strip as it is advanced. This metering wheel is equal in circumference to twice the length of film which is to be advanced for each picture, and has a notch on each half of its periphery which cooperates with a pawl spring-biased into engagement with it. A ratchet is mounted on the film advancing shaft and a second pawl is spring-biased into engagement with this ratchet, but the second pawl and the first pawl are so interconnected that the second pawl can engage the ratchet only when the first pawl is in the notch in the metering wheel. Thus, as the film is advanced, the first pawl rides on the periphery of the metering wheel and the second pawl is held out of engagement with the ratchet, but when the appropriate amount of film has been advanced, and the first pawl is aligned with one of the notches on the film metering wheel, the first pawl engages the notch on the film metering wheel, allowing the second pawl to engage the ratchet to lock the film advancing shaft against further rotation. When the shutter is operated, a slider is actuated to disengage the first and second pawls from the metering wheel and ratchet, respectively, permitting winding of the film to the next exposure position, whereupon the first pawl will engage the other notch in the metering wheel periphery and the second pawl will engage the ratchet, locking the film winding knob against further movement.

When the shutter has been operated to expose a picture and has returned to its normal rest position, the slider, in addition to freeing the film metering wheel and film winding ratchet, also locks the shutter against movement, thus preventing a double exposure. Rotation of the film winding knob moves the slider to a position in which the shutter may be operated to effect the next exposure. A manual control is provided to unlatch the second pawl from the film winding ratchet to permit free winding of the leader and trailer strips of the film roll during loading and unloading of the camera.

The invention will now be described in greater detail in connection with the appended drawings, which illustrate one embodiment of the invention and in which:

FIG. 5 is a perspective view showing a portion of the shutter mechanism, the slider and a portion of the film winding shaft, and illustrating the relative positions of these parts at one point in the camera operating cycle and showing their function in the double exposure prevention mechanism of the camera of FIGS. 1–4;

FIG. 6 is a perspective view similar to FIG. 5 but representing another point in the camera operating cycle;

FIG. 7 is a perspective view similar to FIGS. 5 and 6 but representing still another point in the camera operating cycle; and FIG. 8 is a perspective view illustrating the film metering mechanism of the camera of FIGS. 1–4.

Figure 1:
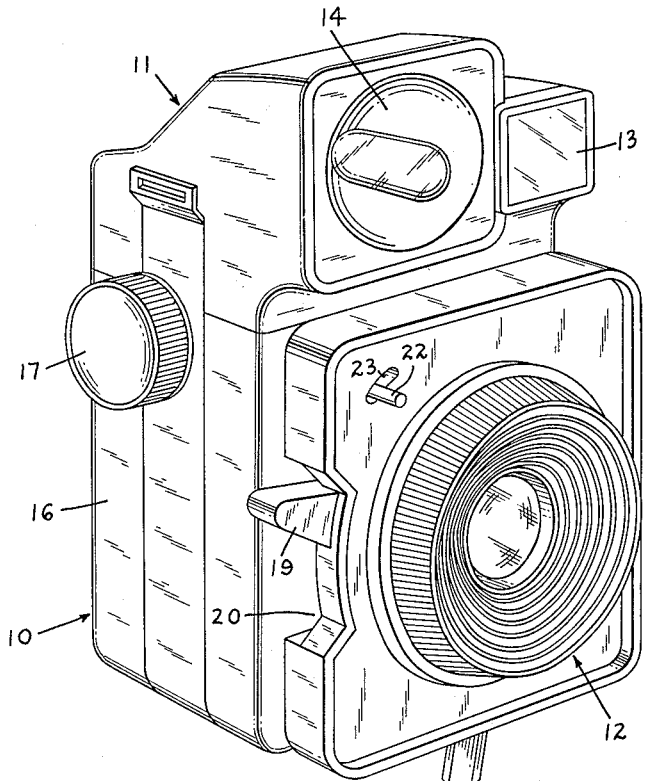
FIG. 1 is a perspective view showing the front and the winding knob side of a camera embodying the invention.

Referring now to the drawings, and more particularly to FIG. 1, the camera comprises a housing having a body 10, an upper portion 11 and a lens holder 12. The upper portion 11, which is removably attached to the body 10, houses a view finder 13 and a flash unit 14. The lens holder 12 is removably secured to the front of the camera body 10 by means of spaced screws, as shown at 15 in FIG. 4. A rear portion 16 of the camera body is removably attached to the remainder of the camera body to permit access to the camera interior for loading and unloading film rolls.

A film winding knob 17 shown at one side of the camera body is mounted on a film winding shaft 18 which extends through the camera body side wall. Rotation of knob 17 in a clockwise direction (FIG. 1) serves to wind film from an initially loaded spool onto an initially unloaded take-up spool, as is customary in roll film cameras.

A shutter operating lever 19 projects outwardly through a slot 20 in one side wall of the lens holder 12. A color-black and white adjustment lever 21 extends downwardly through a slot in the bottom wall of lens holder 12. The end of a load-unload control rod 22 projects outwardly through an arcuate slot 23 in the front wall of lens holder 12.

A spool 24 of unexposed film is mounted in the lower part of the camera body on the usual mounting stub shafts (not shown) and the film, shown at F, passes adjacent the rear wall of the camera body to a take-up spool 25 mounted in the upper part of the camera body. The take-up spool is supported at one side by the usual stub shaft (not shown) and at the other side by the inner end of the winding knob shaft 18 which is recessed in the usual way to receive the end of the film spool.

In going from spool 24 to spool 25 the film F passes across the rear of camera cone 26. A film metering wheel 27 is mounted so as to engage the film adjacent one edge of the latter as it passes the center portion of the cone. The metering wheel is rotatably mounted on a shaft (not shown) carried in the camera cone body. The metering wheel, which acts in a slot provided at one side of the rear end of the cone 26, is engaged by and rotated by contact with the film. The circumference of the metering wheel is equal to twice the film length provided for each picture, or, in other words, to twice the distance between the centers of adjacent frames on the film strip.

A window 28 with the usual red filter 29 is provided in the rear wall of the camera body in alignment with the center of the cone 26 to permit visual observation of the exposure markings on the back of the film F.

A disc 30, which may be integral with or attached to the metering wheel 27 projects outwardly on the side of the metering wheel away from the cone 26. The disc 30 is provided with notches 31 and 32 in the periphery thereof and spaced 180° apart.

A ratchet wheel 33 is mounted on the inner end of the film advancing shaft 18 and may be integral therewith. A radial cam 34 having a tooth 34' is mounted on the shaft 18 adjacent the ratchet 33 and may be integral with the shaft 18 and ratchet 33.

A first pawl 35 is pivotally mounted on a pin or shaft 36 secured to the camera body and has a lower arm 37, an upper arm 38, and a forwardly projecting arm 39. A second pawl 40 is pivotally mounted on pin 36 adjacent pawl 35. The pawl 40 projects forwardly and is adapted to lie adjacent arm 39 of pawl 35.

The pawl 35 is urged to rotate in a clockwise direction (FIG. 8) by a spring wire 41, which extends around pin 36 and has one end hooked over the rear edge of arm 37, the other end abutting against a stop 42 projecting from the camera body. When the pawl 35 rotates in a clockwise direction under the bias imposed by spring 41, an inwardly extending tab 43 at the lower end of arm 37 is urged into contact with the periphery of disc 30 and into notches 31 and 32 in the periphery of disc 30. The forward edge 44 of tab 43 is bent upwardly, as best shown in FIG. 8.

A tab 45 projects inwardly from the upper edge of arm 39 of pawl 35 and is adapted to contact the upper edge of pawl 40. An outwardly extending tab 46 is provided at the upper edge of arm 38 of pawl 35. A rearwardly extending projection 47 is provided at the outer end of tab 46. In this description, the lens side of the camera body is considered the front and the film winding knob side is considered the outer side.

A spring 48 is provided to urge pawl 40 to rotate in a clockwise direction so that the forward upper corner thereof will be biased into engagement with the teeth of ratchet wheel 33. One end of spring 48 is affixed to a projection 49 extending from the camera body. The other end of spring 48 is bent inwardly to act in an elongated slot 50 provided in pawl 40.

As mentioned previously, one end of control rod 22 extends through an elongated slot 23 in lens holder 12. The other end 51 of control rod 22 extends into and acts in an elongated slot 52 in pawl 40. Between the forwardly extending leg at one end of control rod 40 and the outwardly extending leg at the other end thereof, there are provided a downwardly extending leg 53 and a forwardly extending leg 54. The leg 53 lies in an axially extending radial slot 55 provided in a bushing 56. The bushing 56, which may be cylindrical or slightly tapered, is affixed at the forward end thereof to the front wall of camera body 10. The walls of slot 55 confine leg 54 so that arcuate motion of the front end of control rod 22 results in a corresponding rotation of leg 51.

Figure 4:
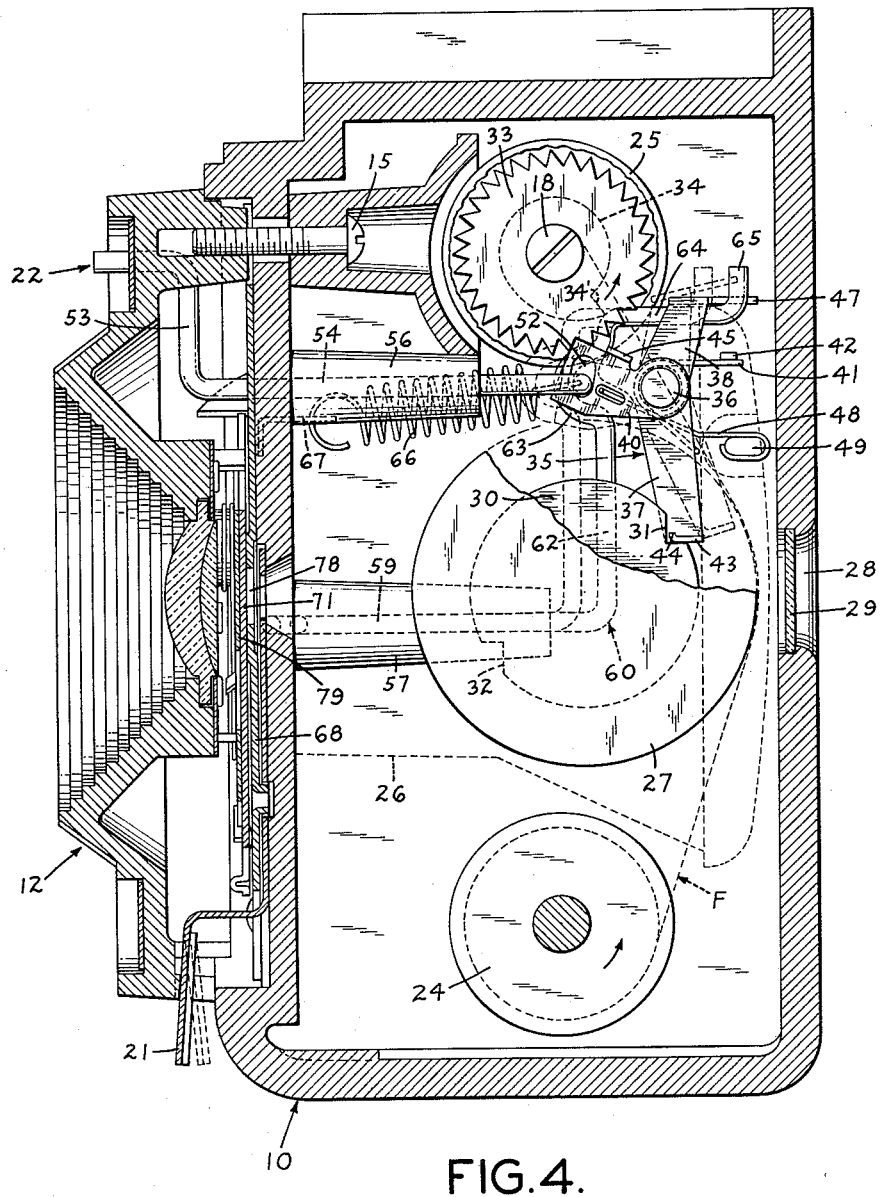
FIG. 4 is a sectional view taken generally along the line 4—4 of FIG. 3 and including the lens holder but with the camera cone shown only in phantom.

In FIG. 1 the control rod 22 is shown in the "load" position, while in FIGS. 4 and 8 the control rod is shown in the "exposure" position. Typically, the control rod 22 might be rocked through an angle of 15° from the "exposure" to the "load" position thereof. With the control rod in the "exposure" position, control rod 22 is not effective in determining the position of pawl 40, but that position is determined by the biasing action of spring 48 and by the rotational position of pawl 35, as will be described below. But when the front end of control rod 22 is moved to the "load" position shown in FIG. 1, the leg 51 is rocked downwardly and, by engagement thereof with the bottom of elongated slot 52, rocks the pawl 40 in a counterclockwise direction (FIG. 8), causing the pawl to be disengaged from the ratchet wheel 33. With the pawl 40 out of engagement with the ratchet wheel 33, the ratchet wheel is free to turn, permitting winding of the leader and trailer portions of the film strip onto the take-up spool by rotation of winding knob 17.

A bushing 57 is mounted on and extends rearwardly from the front wall of the camera body 10 beneath the bushing 56. The bushing 57 has an axially extending radial slot 58 which accommodates a forwardly extending leg 59 of a slider 60. The leg 59 is longer than the bushing 57 to permit axial motion of the slider 60 as well as rotational motion, as will be described below.

The front end of the slider 60 is in the form of an outwardly extending leg 61 which is disposed at a right angle to the leg 59 and is joined to the latter by a sharp radius bend. An upwardly extending leg 62 is joined to the leg 59 at the inner end of the latter. The leg 62 has a forwardly extending loop 63 near the upper end thereof. A rearwardly extending leg 64 is joined to the upper end of leg 62. The rear end of the slider 60 is formed by an upwardly extending leg 65 which is joined to the rear end of leg 64. Legs 59, 62, 64 and 65 lie in a common plane which is disposed at right angles to the plane of leg 61.

Leg 65 is disposed so as to engage the rear edge of tab 46 of pawl 35 when slider 60 is moved forwardly, as best shown in FIGS. 4 and 8. In its rearmost position, leg 65 is clear of projection 47 of tab 46, as best shown in FIG. 8, permitting an outward rocking motion of leg 65.

Slider 60 is biased in a forward direction by a coil spring 66. The rear end of coil spring 66 is looped around forwardly extending loop 63 of slider leg 62. The front end of spring 66 is passed through a hole provided in a bracket 67. The bracket 67 is L-shaped with the horizontal leg thereof passing through the front wall of body 10 and the vertical leg lying in a slot in the front surface of the front wall of body 10.

A generally circular mounting plate 68 is mounted on the front surface of the front wall of camera body 10. Slots 69 in the periphery of plate 68 accommodate the screws which serve to attach the lens holder 12 to the camera body 10. The mounting plate has slots which accommodate the control rod 22 and the front end of slider 60, respectively. The mounting plate may be pinned or otherwise affixed to the front wall of the camera body, as shown at 70 in FIG. 3. The mounting plate 68, the color-black and white plate 21, and the front wall of the camera body have aligned central apertures which permit light to enter the cone 26 for formation of images on the film F.

A lower shutter blade 71 is slidably mounted on mounting plate 68 by means of a shaft 72 which projects forwardly from the front face of mounting plate 68. The lower shutter blade 71 is pivotable about the shaft 72.

Figure 3:
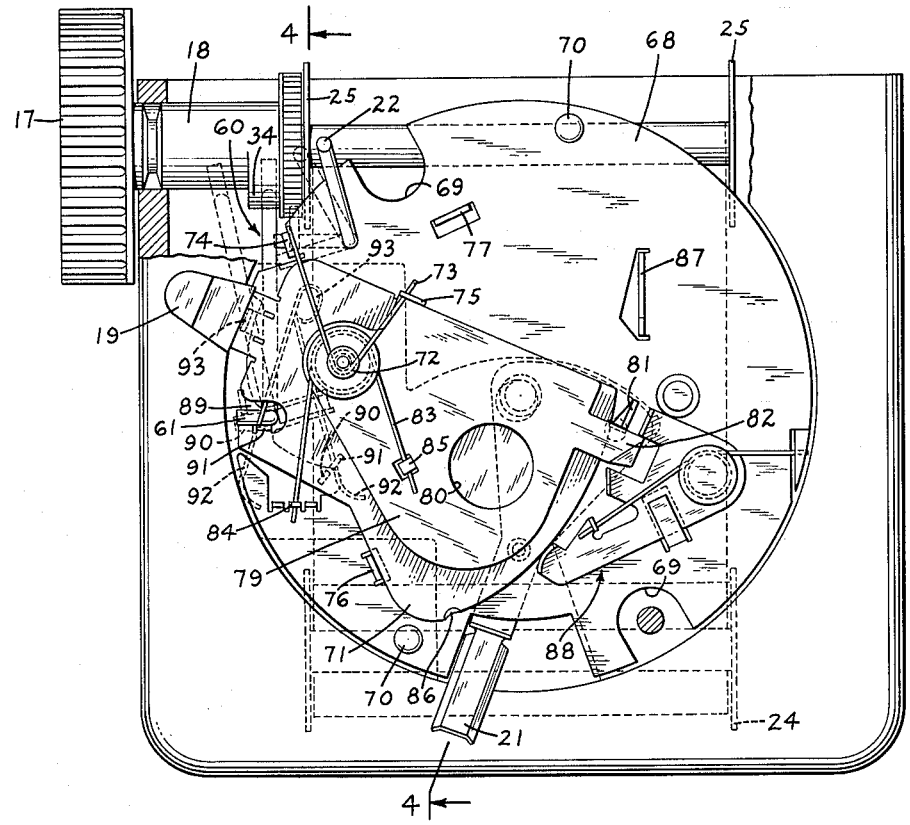
FIG. 3 is a front view of the camera of FIG. 1 with the lens holder removed.

Lower shutter blade 71 is biased towards its rest position shown in FIG. 3 by a spring wire 73 which extends around shaft 72, one end of spring 73 bearing against a forwardly extending tab 74 on mounting plate 68 and the other end of spring 73 bearing against the walls of a slot provided in one side of a tab 75 which projects forwardly from the upper edge of shutter blade 71. The spring 73 forces shutter blade 71 to pivot in a clockwise direction (FIG. 3) until one edge of the shutter blade 71 contacts a tab 76 which projects upwardly from mounting plate 68.

Lower shutter blade 71 may be manually pivoted in a counterclockwise direction (FIG. 3) by depressing shutter operating lever 19. The lever 19 may be integral with lower shutter blade 71. Counterclockwise rotation of shutter blade 71 is checked by contact of the upper edge of shutter blade 71 with a tab 77 which projects forwardly from mounting plate 68. The maximum rotational travel of lower shutter blade 71 typically might be 47°. The lower shutter blade 71 is provided with an exposure aperture 78 (FIG. 4) which is aligned with the apertures in mounting plate 68 and the front wall of the camera body when the shutter blade 71 is in its extreme counterclockwise position.

An upper shutter blade 79 is pivotally mounted on the shaft 72 directly in front of lower shutter blade 71. Shutter blade 79 has an exposure aperture 80 which, when aligned with aperture 78, exposes the film.

During a major portion of the counterclockwise rotation of lower shutter blade 71, the upper shutter blade 79 is restrained against rotation by contact between a forwardly projecting tab 81 on mounting plate 68 and the upper edge of a tongue 82 which projects from the end of upper shutter blade 79. When rotation of the lower shutter blade 71 is almost complete, e.g., 45° out of 47°, the upper shutter blade is freed from tab 81 and is rotated in a counterclockwise direction (FIG. 3) by action of a spring wire 83 which extends around a collar on shaft 72 and has one end affixed to a tab 84 projecting forwardly from mounting plate 68 and the other end held by a tab 85 projecting forwardly from upper shutter blade 79.

The tongue 82 is freed from tab 81 when a dimple 86 on the front surface of lower shutter blade 71 rides under tongue 82, lifting tongue 82 above tab 81. This permits spring 83 to rotate the upper shutter blade 79 in a counterclockwise direction until the upper edge of the shutter blade 79 contacts tab 75 on lower shutter blade 71. During the counterclockwise travel of upper shutter blade 79 the shutter apertures become aligned, permitting the exposure, and then the upper shutter blade 79, in traveling to its final counterclockwise position, again closes the aperture. A forwardly extending tab 87 on mounting plate 68 contacts the undersurface of tongue 82 and acts to slow upper shutter blade 79 at the time of exposure. A mechanism 88 acts as a timing device to delay the start of rotation of upper shutter blade 79 by a predetermined amount, as is well known in the art.

Lower shutter blade 71 has an inwardly extending open-ended slot 89 in one edge thereof. The slot 89 is intended to accommodate the front leg 61 of slider 60, as will be described below. The lower edge of slot 89 has a rearwardly extending tab 90 and a forwardly extending tab 91, best shown in FIGS. 5–7.

A lock wire 92 is affixed at one end thereof to a projection 93 extending forwardly from mounting plate 68. The lock wire 92 contacts the inner edge of tab 90, as best shown in FIGS. 5 and 6.

Film Loading

To load the camera, the rear part of the camera body is removed, an empty take-up spool 25 is installed and a full film spool 24 is installed. The leading strip of the film roll is passed around the rear of cone 26 and is threaded into the take-up spool in the usual way. The rear part of the camera body is replaced and the winding knob 17 is rotated to wind film onto spool 25 until the designation of the first picture area is aligned with the film window 28. Before the winding knob 17 may be rotated, the control rod 22 must be moved to the left (FIG. 1) so that the rear leg 51 of the control rod will disengage pawl 40 from ratchet wheel 33. When the first picture area of the film is in its exposure position, control rod 22 is moved to the right (FIG. 1), whereby the rear leg 51 of the control rod will free pawl 40 so that spring 48 acting in slot 50 will cause pawl 40 to rock in a clockwise direction (FIG. 8) re-engaging pawl 40 and ratchet wheel 33 and preventing further film winding.

Exposure

The camera is now ready for the first exposure and this is effected by manually moving the exposure lever 19 downwardly so that lower shutter blade 71 is rocked in a counterclockwise direction (FIG. 3) until it is stopped by contact with tab 77. After the lower shutter blade has traveled a major portion of its movement, e.g., 45° out of 47°, dimple 86 raises upper shutter blade 79, freeing the latter from tab 81 and permitting spring 83 to rotate upper shutter blade 79 in a counterclockwise direction to make the exposure. When the exposure lever 19 is released, spring 73 forces lower shutter blade 71 to return to its initial rest position. Contact between tab 75 and the upper edge of upper shutter blade 79 causes the latter to return to rest position with lower shutter blade 71 and against the action of spring 83. Tab 81 is inclined so that tongue 82 may ride over tab 81 as the upper shutter blade 79 rocks in a clockwise direction to its rest position.

Double Exposure Prevention

When lower shutter blade 71 returns to its rest position, slot 89 becomes aligned with the forward leg 61 of slider 60 and spring 66 forces slider 60 to move axially forward into slot 89. This is the position illustrated in FIG. 7. Contact between slider 60 and the upper wall of slot 89 will prevent rotation of lower shutter blade 71, thus locking the lower shutter blade and preventing a double exposure.

The winding knob 17 is then turned manually to wind additional film and bring the second frame into exposure position. Rotation of winding knob 17 causes rotation of shaft 18 and hence of cam 34. As cam 34 is rotated, projecting tooth 34' contacts leg 62 of slider 60 above loop 63 and forces slider 60 to move axially rearwardly. As slider 60 moves rearwardly, it becomes clear of slot 89, thereby unlocking the lower shutter blade 71.

The forward position of slider 60 in which the lower shutter blade 71 is locked is shown in FIG. 7 and in the dotted line position of slider 60 in FIG. 4. The rearward position of slider 60 in which the lower shutter blade 71 is unlocked is shown in FIG. 5, and in the solid line position of slider 60 in FIG. 4.

As slider 60 is forced rearwardly by rotation of cam 34, leg 61 of slider 60 reaches a position behind lock wire 92, whereupon lock wire 92 springs from its position contacting leg 59 of slider 60 (FIG. 6) to its position in front of and contacting leg 61 (FIG. 5). Lock wire 92 serves to prevent spring 66 from moving slider 60 forwardly and relocking the lower shutter blade 71 when tooth 34' is free of leg 62, as in FIG. 5.

Motion of lower shutter blade 71 during the next exposure operation causes tab 90 to swing lock wire 62 to the right (FIG. 3) so that spring 66 can move slider 60 forwardly into contact with lower shutter blade 71. Hence, when the lower shutter blade 71 returns to its rest position, lock wire 62 will not be able to prevent further forward motion of slider 60 to lock the lower shutter blade against a double exposure.

To prevent slider 60 from jamming with cam 34 during the forward motion of slider 60, the slider 60 is rocked outwardly to a position in which it will clear tooth 34'. This outward rocking of slider 60, which typically might be through an arc of 12°, is shown by the dotted line position of slider 60 in FIGS. 3 and 6. The outward rocking of slider 60 is effected by a tab 93 extending rearwardly from lower shutter blade 71 and arranged to contact leg 61 of slider 60 as lower shutter blade 71 is rocked to its exposure position. The tab 91 contacts leg 61 as lower shutter blade 71 returns by clockwise rotation to its rest position and forces slider 60 to rock back to its position with leg 62 vertical, i.e., the solid line position of FIG. 6. If cam 34 is so positioned as to be in the path of slider 60 when the latter is urged to return to its vertical position, the leg 62 of slider 60 will rest against the side of cam 34 until winding knob 17 is turned again for the next picture, again allowing slider 60 to be in the vertical position thereof in which the face of cam 34 contacts leg 62.

Film Metering

Positioning of the first picture area of each roll in exposure position is effected by visual inspection through window 28. All other picture areas are properly positioned automatically. Thus, metering wheel 27 is in driven contact with the film strip and rotation of the metering wheel by the film strip serves to meter the film lengths from frame to frame. The circumference of the metering wheel is twice the film length for each exposure, and hence rotation of metering wheel 27 through 180° corresponds to advance of one frame.

During camera loading and advance of the leader strip and first picture area the metering wheel 27 is locked in position by engagement of tab 43 in either of notches 31 and 32 of metering disc 30 which is attached to or integral with and is concentric with metering wheel 27. Engagement of tab 43 in the disc notches is effected by the force of spring 41.

Figure 2:
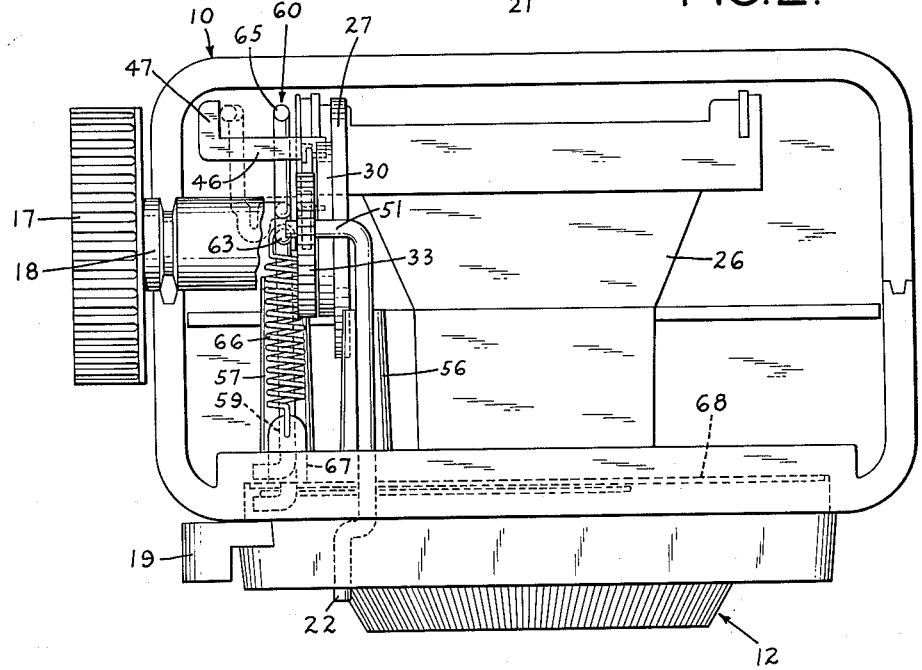
FIG. 2 is a partial top view of the camera of FIG. 1 with the upper part of the camera housing removed.

After the first picture has been exposed, slider 60 moves forwardly to lock the lower shutter blade 71, as described previously. Forward motion of slider 60 is effected by action of spring 66 which is tensioned when cam 34 drives slider 60 rearwardly. As slider 60 moves forwardly, leg 65 contacts the rear edge of tab 46 and pivots pawl 35 in a counterclockwise (FIG. 2) direction about shaft 36 and against the bias of spring 41. This pivoting of pawl 35 causes tab 43 to move out of engagement with the notch in metering disc 30, freeing the latter for rotation with the film strip. As pawl 35 pivots in a counterclockwise direction, tab 45 forces pawl 40 likewise to pivot a counterclockwise direction, withdrawing pawl 40 from engagement with ratchet wheel 33. Elongated slot 52 is made of sufficient length that pawl 40 may be pivoted without disturbing control rod 22.

The counterclockwise pivoted position of pawl 35 is shown in dotted lines in FIG. 4. Pawls 35 and 40 will remain in their counterclockwise pivoted positions so long as slider 60 remains in its forward position and thereafter until metering wheel 27 and metering disc 30 have been rotated through 180° to bring the other metering disc slot into alignment with tab 43.

As explained previously, when winding knob 17 is rotated to advance the film strip to the next frame, cam 34 forces slider 60 backward against the action of spring 66. Rearward motion of leg 65 of slider 60 frees pawl 35 from slider 60. However, as the film advancing shaft was rotated to actuate cam 34, the film strip was advanced by corresponding rotation of the spool 25 and contact between the film strip and metering wheel 27 thereby resulted in a rotation of the metering wheel 27 and metering disc 30. Hence, when cam 34 forces slider 60 rearwardly, edge 44 of tab 43 is riding on the surface of disc 30 at some point between the slots 31 and 32. As a result pawl 35 is held in a counterclockwise rotated position and in turn tab 45 of pawl 35 holds pawl 40 in a counterclockwise rotated position in which tab 40 is held out of engagement with ratchet wheel 33.

When a full frame of film has been advanced, tab 43 of pawl 40 will again be aligned with one of the notches in metering disc 30. Spring 41 will urge pawl 35 to rotate in a clockwise direction (FIG. 8), permitting spring 43 to rotate pawl 40 in a clockwise direction into engagement with ratchet wheel 33. Engagement of pawl 40 and ratchet wheel 33 will lock the film advancing shaft and hence the film winding knob will be locked against further rotation until operation of lower shutter blade 71 in making an exposure causes slider 60 to move forwardly and rotate pawls 35 and 40 in a counterclockwise direction, as described above.

The sequential operations of double exposure prevention and film metering are continued until the last frame has been exposed. The last frame and the film trailer strip are then wound onto the take-up spool. For this purpose, control rod 22 is moved to its "load" position so that pawl 40 will be held out of engagement with ratchet wheel 33, as described in connection with film loading, after the subsequent rearward movement of slider 60 and the later engagement of pawl 35 in the metering disc notch would otherwise have permitted pawl 40 to engage ratchet wheel 33. Since pawl 35 will not be moved by action of control rod 22, tab 43 will remain in contact with the notch in disc 30 until after the first exposure of the next film roll.

While the invention has been described in connection with a specific embodiment thereof, various modifications thereof will occur to those skilled in the art without departing from the spirit and scope of the invention as set forth in the appended claims. And while the invention has been described in connection with a specific camera, it will be evident that it can be used to advantage with other types of cameras.

What is claimed is:

1. In a roll film camera having a camera body, a shutter mechanism and a film winding mechanism, the combination comprising a shutter blade pivotally mounted in said camera and forming a part of said shutter mechanism, a film metering wheel rotatably mounted in said camera and arranged so that a peripheral surface of said film metering wheel engages and is rotated by the film upon operation of said film winding mechanism, said film metering wheel having a notch, a ratchet wheel connected to said film winding mechanism and arranged to rotate upon operation of the latter, first and second pawls pivotally mounted in said camera, first biasing means arranged to urge said first pawl into engagement with said notch, second biasing means arranged to urge said second pawl into engagement with said ratchet wheel to lock said film winding mechanism against operation, means on said first pawl arranged to contact said second pawl to hold said second pawl out of engagement with said ratchet wheel except when said first pawl enters said notch, a slider movable between a first position in which said slider is out of contact with said shutter blade and a second position in which said slider is in locking engagement with said shutter blade to prevent exposure making movement thereof, third basing means urging said slider into said second position thereof, a cam arranged to rotate with said ratchet wheel and to contact said slider, rotation of said cam moving said slider from said second position to said first position thereof, and means on said slider arranged to contact said second pawl and to pivot said second pawl out of engagement with said notch when said slider moves into said second position thereof.

2. In a roll film camera having a camera body, a shutter mechanism and a film winding mechanism, the combination comprising a shutter blade pivotally mounted in said camera and forming a part of said shutter mechanism, a film metering wheel rotatably mounted in said camera and arranged so that a peripheral surface of said film metering wheel engages and is rotated by the film upon operation of said film winding mechanism, said film metering wheel having a notch, a ratchet wheel connected to said film winding mechanism and arranged to rotate upon operation of the latter, first and second pawls pivotally mounted about a common point in said camera, first spring biasing means arranged to urge said first pawl into engagement with said notch, second spring biasing means arranged to urge said second pawl into engagement with said ratchet wheel to lock said film winding mechanism against operation, means on said first pawl arranged to contact said second pawl to hold said second pawl out of engagement with said ratchet wheel except when said first pawl enters said notch, a slider linearly movable between a first position in which said slider is out of contact with said shutter blade and a second position in which said slider is in locking engagement with said shutter blade to prevent exposure making movement thereof, third spring biasing means urging said slider into said second position thereof, a cam arranged to rotate with said ratchet wheel and to contact said slider, rotation of said cam moving said slider from said second position to said first position thereof, means on said slider arranged to contact said second pawl and to pivot said second pawl out of engagement with said notch when said slider moves into said second position thereof, and manually operable means to pivot said second pawl out of engagement with said ratchet wheel.

3. In a roll film camera having a camera body, a shutter mechanism and a film winding mechanism, the combination comprising a shutter blade pivotally mounted in said camera and forming a part of said shutter mechanism, a film metering wheel rotatably mounted in said camera and arranged so that a peripheral surface of said film metering wheel engages and is rotated by the film upon operation of said film winding mechanism, said film metering wheel having a notch, a ratchet wheel connected to said film winding mechanism and arranged to rotate upon operation of the latter, first and second pawls pivotally mounted in said camera, first spring biasing means arranged to urge said first pawl into engagement with said notch, second spring biasing means arranged to urge said second pawl into engagement with said ratchet wheel to lock said film winding mechanism against operation, means on said first pawl arranged to contact said second pawl to hold said second pawl out of engagement with said ratchet wheel except when said first pawl enters said notch, a slider linearly movable between a first position in which said slider is out of contact with said shutter blade and a second position in which said slider is in locking engagement with said shutter blade to prevent exposure making movement thereof, third spring biasing means urging said slider into said second position thereof, a cam arranged to rotate with said ratchet wheel and to contact said slider, rotation of said cam moving said slider from said second position to said first position thereof, means on said slider arranged to contact said second pawl and to pivot said second pawl out of engagement with said notch when said slider moves into said second position thereof, movable means mounted in said camera so as to be urged into the path of advance of said slider from said first position thereof toward said second position thereof, means to move said movable means out of said path when said shutter blade is pivoted to effect an exposure, and manually operable means to pivot said second pawl out of engagement with said ratchet wheel.

4. In a roll film camera having a camera body, a shutter mechanism and a film winding mechanism, the combination comprising a shutter blade pivotally mounted in said camera and forming a part of said shutter mechanism, a film metering wheel rotatably mounted in said camera and arranged so that a peripheral surface of said film metering wheel engages and is rotated by the film upon operation of said film winding mechanism, said film metering wheel having a notch, a ratchet wheel connected to said film winding mechanism and arranged to rotate upon operation of the latter, first and second pawls pivotally mounted about a common point in said camera, first spring biasing means arranged to urge said first pawl into engagement with said notch, second spring biasing means arranged to urge said second pawl into engagement with said ratchet wheel to lock said film winding mechanism against operation, means on said first pawl arranged to contact said second pawl to hold said second pawl out of engagement with said ratchet wheel except when said first pawl enters said notch, a slider linearly movable between a first position in which said slider is out of contact with said shutter blade and a second position in which said slider is in locking engagement with said shutter blade to prevent exposure making movement thereof, third spring biasing means urging said slider into said second position thereof, a cam arranged to rotate with said ratchet wheel and to contact said slider, rotation of said cam moving said slider from said second position to said first position thereof, means on said slider arranged to contact said second pawl and to pivot said second pawl out of engagement with said notch when said slider moves into said second position thereof, movable means mounted in said camera so as to be urged into the path of advance of said slider from said first position thereof toward said second position thereof, means to move said movable means out of said path when said shutter blade is pivoted to effect an exposure, means to rock said slider out of contact with said cam when said shutter blade is pivoted to effect an exposure and to return said slider into contact with said cam when said shutter blade is returned after completion of an exposure, and manually operable means to pivot said second pawl out of engagement with said ratchet wheel.

5. In a roll film camera having a camera body, a shutter mechanism and a film winding mechanism, the combination comprising a shutter blade pivotally mounted in said camera and forming a part of said shutter mechanism, said blade having an opening therein, a rotatable film winding shaft forming a part of said film winding mechanism, a film metering wheel rotatably mounted in said camera and having a peripheral surface arranged to contact said film whereby said film metering wheel is rotated by the film upon operation of said film winding mechanism, said film metering wheel having a notched pawl-engaging surface, a ratchet wheel mounted on said film winding shaft and arranged to rotate therewith, a cam mounted on said film winding shaft and arranged to rotate therewith, first and second pawls pivotally mounted in said camera, said first pawl having first and second arms extending generally in opposite directions from said pivot point, said first arm being adapted to contact said pawl-engaging surface, first biasing means contacting said first pawl and urging said first arm into contact with said pawl-engaging surface, the length of said pawl-engaging surface and the notching thereof being selected so that said first arm enters a notch in said pawl-engaging surface each time said wheel rotates through an arc corresponding to a complete film frame, second biasing means contacting said second pawl and urging said second pawl into locking contact with said ratchet wheel, a slider mounted in said camera and being movable between a front position in which said slider extends into said opening in said shutter blade to lock said blade against rotation and a rear position in which said slider is clear of said shutter blade, third biasing means arranged to urge said slider into said front position thereof, a movable element mounted in said camera so as to be urged into the path of said slider as said slider moves from said rear toward said front position thereof, said element preventing said slider from entering said opening, means to move said element out of said path when said shutter blade is moved to effect an exposure thereby to permit said slider to enter said opening after an exposure has been made, said slider having a first extension arranged to contact said cam whereby rotation of said cam forces said slider to move from said front to said rear position thereof, said slider having a second extension arranged to contact said second arm of said first pawl and to pivot said first pawl against the bias of said first biasing means when said slider moves into said front position thereof thereby to disengage said first arm from said notch, means on said first pawl arranged to contact said second pawl to pivot said second pawl out of engagement with said ratchet wheel when said slider moves into said front position thereof thereby to free said film winding mechanism for film winding operation after an exposure has been made.

6. In a roll film camera having a camera body, a shutter mechanism and a film winding mechanism, the combination comprising a shutter blade pivotally mounted in said camera and forming a part of said shutter mechanism, said blade having an opening therein, a rotatable film winding shaft forming a part of said film winding mechanism, a film metering wheel rotatably mounted in said camera and having a peripheral surface arranged to contact said film whereby said film metering wheel is rotated by the film upon operation of said film winding mechanism, said film metering wheel having a notched pawl-engaging surface, a ratchet wheel mounted on said film winding shaft and arranged to rotate therewith, a cam mounted on said film winding shaft and arranged to rotate therewith, first and second pawls pivotally mounted about a common point in said camera, said first pawl having first and second arms extending generally in opposite directions from said pivot point, said first arm being adapted to contact said pawl-engaging surface, first spring biasing means contacting said first pawl and urging said first arm into contact with said pawl-engaging surface and causing said first arm to enter a notch in said pawl-engaging surface when aligned therewith, the length of said pawl-engaging surface and the number and spacing of notches therein being selected so that the arc traversed by said pawl-engaging surface between successive engagements of said first arm in a notch corresponds to a film advance of one frame, second spring biasing means contacting said second pawl and urging said second pawl into locking contact with said ratchet wheel, a slider mounted in said camera and being linearly movable between a front position in which said slider extends into said opening in said shutter blade to lock said blade against rotation and a rear position in which said slider is clear of said shutter blade, third spring biasing means arranged to urge said slider into said front position thereof, a lock wire mounted in said camera so as to be urged into the path of said slider as said slider moves from said rear toward said front position thereof, said lock wire preventing said slider from entering said opening, means on said shutter blade to move said lock wire out of said path when said shutter blade is moved to effect an exposure thereby to permit said slider to enter said opening after an exposure has been made, said slider having a first extension arranged to contact said cam whereby rotation of said cam forces said slider to move from said front to said rear position thereof, said slider having a second extension arranged to contact said second arm of said first pawl and to pivot said first pawl against the bias of said first spring means when said slider moves into said front position thereof thereby to disengage said first arm from a notch in said pawl-engaging surface, means on said first pawl arranged to contact said second pawl to pivot said second pawl out of engagement with said ratchet wheel when said slider moves into said front position thereof thereby to free said film winding mechanism for film winding operation after an exposure has been made, and manually operable means to pivot said second pawl out of engagement with said ratchet.

7. In a roll film camera having a camera body, a shutter mechanism and a film winding mechanism, the combination comprising a shutter blade pivotally mounted in said camera and forming a part of said shutter mechanism, said shutter blade being rockable from a rest position to effect an exposure and returning to said rest position after an exposure, said blade having an opening therein, a rotatable film winding shaft forming a part of said film winding mechanism, a film metering wheel rotatably mounted in said camera and having a peripheral surface arranged to contact said film whereby said film metering wheel is rotated by the film upon operation of said film winding mechanism, said film metering wheel having a notched pawl-engaging surface, a ratchet wheel mounted on said film winding shaft and arranged to rotate therewith, a cam mounted on said film winding shaft and arranged to rotate therewith, first and second pawls pivotally mounted about a common point in said camera, said first pawl having first and second arms extending generally in opposite directions from said pivot point, said first arm being adapted to contact said pawl-engaging surface, first spring biasing means contacting said first pawl and urging said first arm into contact with said pawl-engaging surface and causing said first arm to enter a notch in said pawl-engaging surface when aligned therewith, the length of said pawl-engaging surface and the number and spacing of notches therein being selected so that the arc traversed by said pawl-engaging surface between successive engagements of said first arm in a notch corresponds to a film advance of one frame, second spring biasing means contacting said second pawl and urging said second pawl into locking contact with said ratchet wheel, a slider mounted in said camera and being linearly movable between a front position in which said slider extends into said opening in said shutter blade to lock said blade against rotation and a rear position in which said slider is clear of said shutter blade, third spring biasing means arranged to urge said slider into said front position thereof, a lock wire mounted in said camera so as to be urged into the path of said slider as said slider moves from said rear toward said front position thereof, said lock wire preventing said slider from entering said opening, means on said shutter blade to move said lock wire out of said path when said shutter blade is moved to effect an exposure thereby to permit said slider to enter said opening after an exposure has been made, said slider having a first extension arranged to contact said cam whereby rotation of said cam forces said slider to move from said front to said rear position thereof, said slider having a second extension arranged to contact said second arm of said first pawl and to pivot said first pawl against the bias of said first spring means when said slider moves into said front position thereof thereby to disengage said first arm from a notch in said pawl-engaging surface, means on said first pawl arranged to contact said second pawl to pivot said second pawl out of engagement with said ratchet wheel when said slider moves into said front position thereof thereby to free said film winding mechanism for film winding operation after an exposure has been made, means on said shutter blade arranged to contact said slider and to rock said slider out of contact with said cam when said shutter blade is moved to effect said exposure, means on said shutter blade arranged to contact said slider and to rock said slider into contact with said cam when said shutter blade returns to said rest position thereof, and manually operable means to pivot said second pawl out of engagement with said ratchet without moving said first pawl.

8. In a camera having an exposure aperture, a film winding mechanism and a film metering mechanism, the combination comprising a mounting plate, a first shutter blade pivotally mounted on said mounting plate, a second shutter blade pivotally mounted on said mounting plate about a common axis with said first shutter blade, said shutter blades each having an exposure opening adapted to be aligned with each other and with said aperture to effect an exposure, said first shutter blade having an additional opening, first spring means contacting said first shutter blade and urging said first shutter blade into a rest position thereof in which said aperture is masked, manually operable means to pivot said first shutter blade from said rest position thereof to an exposure position thereof in which said exposure opening in said first shutter blade is aligned with said aperture, second spring means contacting said second shutter blade and urging said second shutter blade from a first position thereof in which said aperture is masked through a second position thereof in which said exposure opening in said second shutter blade is aligned with said aperture and to a third position thereof in which said second shutter blade masks said aperture, a tab on said first shutter blade contacting an edge of said second shutter blade and arranged to force said second shutter blade into said first position thereof when said first shutter blade moves to said rest position from said exposure position thereof, a projection on said mounting plate contacting an edge of said second shutter blade when said second shutter blade is in said first position thereof, contact between said projection and said second shutter blade restraining said second shutter blade against pivoting movement when said first shutter blade is pivoted from said rest position toward said exposure position thereof, a dimple on said first shutter blade arranged to contact a surface of said second shutter blade to lift said second shutter blade out of contact with said projection when said first shutter blade has completed a predetermined major proportion of its motion from said rest position toward said exposure position thereof, a slider linearly movable in said camera between a front position in which said slider extends into said additional opening in said first shutter blade to lock said first shutter blade against rotation and a rear position in which said slider is clear of said first shutter blade, third spring means arranged to urge said slider into said front position thereof, releasable means to lock said film winding mechanism, a pawl pivotally mounted in said camera and operatively coupling said releasable means and said film metering mechanism so that said releasable means locks said film winding mechanism when a full film frame has been wound, means on said slider contacting said pawl and pivoting said pawl to cause said releasable means to unlock said film winding mechanism when said slider moves into said front position thereof, and cam means in said film winding mechanism arranged to contact said slider and to force said slider into said rear position thereof upon operation of said film winding mechanism.

9. In a camera having an exposure aperture, a shutter mechanism comprising a mounting plate, a first shutter blade pivotally mounted on said mounting plate, a second shutter blade pivotally mounted on said mounting plate, said shutter blades each having an opening adapted to be aligned with each other and with said aperture to effect an exposure, first spring means contacting said first shutter blade and urging said first shutter blade into a rest position thereof in which said aperture is masked, manually operable means to pivot said first shutter blade from said rest position thereof to an exposure position thereof in which said opening in said first shutter blade is aligned with said aperture, second spring means contacting said second shutter blade and urging said second shutter blade from a first position thereof in which said aperture is masked through a second position thereof in which said opening in said second shutter blade is aligned with said aperture and to a third position thereof in which said second shutter blade masks said aperture, means on said first shutter blade contacting an edge of said second shutter blade and arranged to force said second shutter blade into said first position thereof when said first shutter blade moves to said rest position from said exposure position thereof, a first projection on said mounting plate contacting an edge of said second shutter blade when said second shutter blade is in said first position thereof, contact between said first projection and said second shutter blade restraining said second shutter blade against pivoting movement when said first shutter blade is pivoted from said rest position toward said exposure position thereof, and a second projection on said first shutter blade arranged to contact a surface of said second shutter blade to lift said second shutter blade out of contact with said first projection when said first shutter blade has completed a predetermined major proportion of its motion from said rest position toward said exposure position thereof.

10. In a camera having an exposure aperture, a shutter mechanism comprising a mounting plate, a first shutter blade pivotally mounted on said mounting plate, a second shutter blade pivotally mounted on said mounting plate about a common axis with said first shutter blade, said first shutter blade overlying said mounting plate and said second shutter blade overlying said first shutter blade, said shutter blades each having an opening adapted to be aligned with each other and with said aperture to effect an exposure, first spring means contacting said first shutter blade and urging said first shutter blade into a rest position thereof in which said aperture is masked, manually operable means to pivot said first shutter blade from said rest position thereof to an exposure position thereof in which said opening in said first shutter blade is aligned with said aperture, second spring means contacting said second shutter blade and urging said second shutter blade from a first position thereof in which said aperture is masked through a second position thereof in which said opening in said second shutter blade is aligned with said aperture and to a third position thereof in which said second shutter blade masks said aperture, a tab on said first shutter blade contacting an edge of said second shutter blade and arranged to force said second shutter blade into said first position thereof when said first shutter blade moves to said rest position from said exposure position thereof, a projection on said mounting plate contacting an edge of said second shutter blade when said second shutter blade is in said first position thereof, contact between said projection and said second shutter blade restraining said second shutter blade against pivoting movement when said first shutter blade is pivoted from said rest position toward said exposure position thereof, and a dimple on said first shutter blade arranged to contact a surface of said second shutter blade to lift said second shutter blade out of contact with said projection when said first shutter blade has completed a predetermined major proportion of its motion from said rest position toward said exposure position thereof.

References Cited in the file of this patent
UNITED STATES PATENTS

| | | |
|---|---|---|
| 2,227,964 | Drotning et al. | Jan. 7, 1941 |
| 2,241,122 | Drotning | May 6, 1941 |
| 2,544,879 | Harvey et al. | Mar. 13, 1951 |
| 2,559,880 | Kesel et al. | July 10, 1951 |